United States Patent [19]

Heidsiek et al.

[11] Patent Number: 4,476,090
[45] Date of Patent: Oct. 9, 1984

[54] MATERIAL FOR JEWELRY AND COMMODITIES AND PROCESS FOR ITS PRODUCTION

[75] Inventors: Horst Heidsiek, Hanau; Gernot Jäckel, Hasselroth, both of Fed. Rep. of Germany

[73] Assignee: Degussa Aktiengesellschaft, Frankfurt, Fed. Rep. of Germany

[21] Appl. No.: 608,251

[22] Filed: May 7, 1984

Related U.S. Application Data

[63] Continuation of Ser. No. 412,209, Aug. 27, 1982, abandoned.

[30] Foreign Application Priority Data

Sep. 4, 1981 [DE] Fed. Rep. of Germany ....... 3135034

[51] Int. Cl.$^3$ ............................. C03C 3/10; B22F 3/16
[52] U.S. Cl. ........................................ 419/19; 419/21; 419/28; 419/29; 419/39; 428/428; 501/19; 501/22; 501/61; 501/75; 501/76
[58] Field of Search ..................... 501/19, 20, 22, 26, 501/61, 75, 76; 419/21, 28, 29, 9, 19, 39, 47; 63/2; 428/428

[56] References Cited

U.S. PATENT DOCUMENTS

| | | | |
|---|---|---|---|
| 2,530,217 | 11/1950 | Bain | 501/19 |
| 2,610,127 | 9/1952 | Kerridge et al. | 501/19 |
| 3,047,409 | 7/1962 | Slayter et al. | 501/19 |
| 3,154,503 | 10/1964 | Janakirama-Rao et al. | 501/19 |
| 3,205,566 | 9/1965 | Breton | 419/9 |
| 3,207,706 | 9/1965 | Hoffman | 501/26 |
| 3,326,645 | 6/1967 | Counts et al. | 419/19 |
| 3,374,110 | 3/1968 | Miller | 75/252 |
| 3,746,568 | 7/1973 | Rybarczyk | 428/428 |
| 4,150,995 | 4/1979 | Moritsu et al. | 501/22 |
| 4,401,767 | 8/1983 | Dietz et al. | 501/19 |

FOREIGN PATENT DOCUMENTS

| | | |
|---|---|---|
| 514338 | 7/1955 | Canada .................. 501/19 |
| 1062401 | 7/1959 | Fed. Rep. of Germany . |
| 1458349 | 11/1968 | Fed. Rep. of Germany . |
| 1400760 | 4/1965 | France . |
| 52-69916 | 6/1977 | Japan .................. 501/22 |

OTHER PUBLICATIONS

Sailer, E. E. et al., "Microelectronic Conductive Composition" IBM Technical Disclosure Bulletin.
Goetzel, C. G.–Treatise on Powder Metallurgy–vol. I (1949) pp. 507-508.
Volf, M. B.–Technical Glasses (1961) pp. 72-74.
Holscher, H. H.–"The Relationship of Viscosity to Processing of Glass" Chart pub'd. by Owens–Illinois Technical Ctr.–Apr. 1, 1968.

*Primary Examiner*—Helen M. McCarthy
*Attorney, Agent, or Firm*—Cushman, Darby & Cushman

[57] ABSTRACT

There is described a new material for jewelry and commodities which has a relatively low density and also is low carat but resistant to oxidation and corrosion. It consists of a noble metal or alloy and 1 to 70 volume % glass, whereby as glass there is used a glass frit having a transformation temperature of 300° to 500° C. and a softening interval of over 80° C. There is also described a process for its production.

25 Claims, No Drawings

MATERIAL FOR JEWELRY AND COMMODITIES AND PROCESS FOR ITS PRODUCTION

This is a continuation of application Ser. No. 412,209, filed Aug. 27, 1982, now abandoned.

BACKGROUND OF THE INVENTION

The invention is directed to a material for jewelry and commodities made of a noble metal which contains 1 to 70 volume percent of glass and a process for the production of this material.

Jewelry objects of old have been manufactured from noble metals such as gold, silver, platinum, and palladium or their alloys. This is also true in part for commodities such as cutlery, clock-cases, spectacles, athletic trophies, badges, or medals.

There are known an entire series of noble metal alloys which are employed for such purposes, whereby the noble metal portion normally predominates. In regard to the material, pieces of jewelry always should be noble, durable and nice. Besides the corresponding material must be readily workable and be available in various shades of color.

The selling price of jewelry and commodity objects made of noble metals today in a large measure is determined by the price of the noble metals contained therein. The jewelry industry therefore has sought to employ alloys having lower noble metal content or to use lighter noble metal materials. These efforts, however, have limits thereon since lower carat alloys no longer have satisfactory physical and chemical properties and are especilly inclined to oxidation and corrosion.

There are known from German patent No. 1,458,461 corrosion resistant sintered metal-glass compacts which contain 2 to 70 volume % glass, whose softening point is within a range of 100° C. of the sintering temperature of the metal which consists of iron, steel, or aluminum. However, these materials have the disadvantage that they have poor shaping properties and have an insufficiently homogeneous distribution of the components, which also is made noticeable in their mechanical problem.

Therefore, it was the problem of the present invention to find a material for jewelry and commodity object consisting of a noble metal and 1 to 70 volume % of glass which is readily workable, also is low carat, yet oxidation and corrosion resistant, can have a relatively low density and is available in various shades of color. Besides there is needed a process for its production.

SUMMARY OF THE INVENTION

This problem was solved according to the invention by using as glass a glass frit having a transformation temperature of 300° to 500° C. and a softening interval of over 80° C. Especially advantageous are glass frits having transformation temperatures between 350° and 450° C. and softening intervals of over 120° C.

The transformation temperature defines the change of the frits from brittle to viscous plastic conditions and is determined by a knick in the temperature properties curve according to DIN 52324 (German Industrial Standard 52324). It is determined dilatometrically on test bodies by applying tangents on the dilatometer curve. The temperature correponding to the point of intersection of the tangents is designated as transformation temperature, at which the frits normally have a viscosity of $0^2$ Pa.sec.

The softening interval is the temperature interval between the beginning of the softening of the frit and its hemisphere temperature, whereby both limiting values are determined on cylindrical test bodies under the heating microscope. At the beginning of softening there is observed a rounding off of edges, at the hemisphere temperature the cylindrical test body is melted together to a hemisphere. The softening interval is a measure of the dependence of viscosity on the temperature.

Preferably there are used glass frits which contain 15 to 75 weight % lead oxide and/or zinc oxide, 5 to 55 weight % silica, 0 to 25 weight % boron oxide, and 0 to 20 weight % alkali oxide, e.g. sodium oxide or potassium oxide. Besides at times there can be added to the glass frit up to 10 weight % of aluminum oxide, zirconium dioxide, titanium dioxide and/or tin dioxide.

By using glass frits having a low transformation temperature and a wide softening interval there is attained already considerably below the usual sintering temperatures of the noble metals or noble metal alloys softening of the glass and through the process of a liquid phase sintering there can be produced high densities and good shaping properties of the materials.

The materials of the invention preferably contain as noble metal components gold, silver, platinum and/or palladium, or their alloys with each other or a non-noble metal such as copper, nickel, tin, or zinc. When a non-noble metal is employed it is generally used in an amount of not over 50% of the total metal. Besides dispersion hardened noble metal powders can also be used as starting material. In order to produce jewelry material having unusual color shades, it is possible to treat the glass frits with colored pigments or other resistant colors.

The material of the invention is produced by mixing the metal powder with 1 to 70 volume % of a fine powder glass frit, pressing, sintering, and heat shaping. Preferably there is used for this metal powder having a particle size $\leq 250$ m$\mu$, especially $\leq 63$ m$\mu$ while there has proven good for the frit particle sizes of $\leq 50$ m$\mu$, especially $\leq 10$ m$\mu$. It is advantageous if the frit particles have a spherical shape or an approximately spherical shape. The powder mixture is pressed at room temperature and pressures of 500 to 5000 bar, then sintered at 500° to 800° C. and subsequently heat shaped at 500° to 700° C. and pressures of 100 to 200 bar, especially by extruders. Molding pressures of 1000 to 3000 bar and sintering temperatures of 550° to 750° C. are advantageous. The glass should have a viscosity of $10^9$ to $10^3$ Pa.sec in the processing, preferably $10^5$ Pa.sec.

By a thermal post treatment of the molded body produced according to the invention at about 400° C. above the transformation temperature of the glass frit there is formed a glass coating on the surface of the material which can be used for decorative purposes, especially if the glass frit is colored.

The materials of the invention made of noble metal and glass have a smaller density than corresponding alloys. Through this at equal material strength or volume there can be saved noble metal. Besides these materials have a higher mechanical strength or a higher wear resistance or resistance to stress than corresponding alloys. They are readily workable and by the use of pure or high carat noble metal resistant to oxidation and corrosion. All known shades of color can be produced and new colors are produced through the coloring of the glass component.

The materials of the invention are solderable and electrolyzable. Also of advantage is an easier recovery of the noble metal from the corresponding wastes.

The composition can consist essentially of or consist of the stated materials and the process can comprise, consist essentially of, or consist of the steps set forth with such materials.

The following examples explain in more detail the material of the invention and its production.

DETAILED DESCRIPTION

Example 1

Silver powder having an average particle size of $\leq 63$ m$\mu$ was mixed with 15 volume % of a glass frit powder having an average particle size of $\leq 10$ m$\mu$ and the composition 70 weight % PbO, 15 weight % SiO$_2$, 10 weight % B$_2$O$_3$ and 5 weight % SnO$_2$ with addition of acetone. The glass frit has a transformation temperature of 433° C. and a softening interval of 100° C. The powder mixture is processed at room temperature in a press with a pressure of 1000 bar to round pins having a diameter of 25 mm. Thereby there is produced a density of 65% of the theoretical density. Subsequently the product was sintered for 1 hour at 550° C. whereby there was attained a density of 85% of the theoretical density. The sintered pins were heated to 450° C. during 30 minutes and extruded at 450° C. and 150 bar to wire of a 1 mm diameter. This wire can be further processed by hammering or cold drawing.

Example 2

Gold powder, having an average particle size of $\leq 63$ m$\mu$ is mixed with 30 volume % of a glass frit powder (average particle size $\leq 10$ m$\mu$) of the composition 50 weight % PbO, 40 weight % SiO$_2$, 3 weight % B$_2$O$_3$, 2 weight % ZrO$_2$ and 5 weight % alkali oxide (e.g. sodium oxide) with addition of acetone. In the cold pressing at 3000 bar there is produced a green density of around 80% of the theoretical density, after the sintering (1 hour, 550° C.) a density of around 88% of the theoretical density. A gold sheet is produced from the sintered pins by hot rolls in a nickel tube by heating the pins in the nickel tube to 600° C. during 10 minutes and hot rolling with a reduction per pass of 0.5 mm until a final thickness of 1 mm. After the removal of the nickel coating the gold sheets are workable. A burnished gold layer is firmly adhesively deposited on the surface.

The entire disclosure of German priority application No. P 3135034.8 is hereby incorporated by reference.

What is claimed is:

1. A material suitable for manufacture of jewelry and commodities consisting essentially of at least 30 volume % of a noble metal and 1 to 70 volume % of oxide glass frit, said glass frit having a transformation temperature of 300° to 500° C. and a softening interval of over 80° C., said material having been formed by mixing a noble metal powder with a 1 to 70 volume % of glass frit, pressing at room temperature with a 500 to 5000 bar, then sintering at a temperature of 500° to 800° C. and then heat shaping at a temperature of 500° to 700° C. and a pressure of 100 to 200 bar.

2. A material according to claim 1 wherein the noble metal is gold, silver, platinum, or palladium or a mixture thereof or their alloys with each other or with copper, nickel, tin, or zinc.

3. A material according to claim 2 wherein the noble metal is gold, silver, platinum, or palladium or a mixture thereof of their alloys with each other.

4. A material according to claim 3 wherein the noble metal is gold.

5. A material according to claim 3 wherein the noble metal is silver.

6. A material according to claim 1 wherein the glass frit has a transformation temperature of 350° to 450° C. and a softening interval of over 120° C.

7. A material according to claim 6 wherein the glass frit contains 15 to 75 weight % of lead oxide, zinc oxide, or a mixture of lead oxide and zinc oxide, 5 to 55 weight % silica, 0 to 25 weight % boron oxide and 0 to 20 weight % alkali oxide.

8. A material according to claim 1 wherein the glass frit contains 15 to 75 weight % of lead oxide, zinc oxide, or a mixture of lead oxide and zinc oxide, 5 to 55 weight % silica, 0 to 25 weight % boron oxide and 0 to 20 weight % alkali oxide.

9. A material according to claim 8 wherein the glass frit contains in addition at least one of
   (a) up to 10 weight % aluminum oxide,
   (b) up to 10 weight % zirconium dioxide,
   (c) up to 10 weight % titanium dioxide, or
   (d) up to 10 weight % tin dioxide.

10. A material according to claim 7 wherein the glass frit contains in addition at least one of
    (a) 2 to 10 weight % aluminum oxide,
    (b) 2 to 10 weight % zirconium dioxide,
    (c) 2 to 10 weight % titanium dioxide, or
    (d) 2 to 10 weight % tin dioxide.

11. A material according to claim 10 wherein the glass frit contains lead oxide and also either tin dioxide or zirconium dioxide.

12. A material according to claim 10 wherein the glass frit has a particle size of $\leq 50$ m$\mu$.

13. A material according to claim 9 wherein the glass frit has a particle size of $\leq 50$ m$\mu$.

14. A material according to claim 8 wherein the glass frit has a particle size of $\leq 50$ m$\mu$.

15. A material according to claim 7 wherein the glass frit has a particle size of $\leq 50$ m$\mu$.

16. A material according to claim 6 wherein the glass frit has a particle size of $\leq 50$ m$\mu$.

17. A material according to claim 2 wherein the glass frit has a particle size of $\leq 50$ m$\mu$.

18. A material according to claim 1 wherein the glass frit has a particle size of $\leq 50$ m$\mu$.

19. A material according to claim 18 wherein the glass frit is made of spherical particles.

20. A material according to claim 1 wherein the glass frit is made of spherical particles.

21. A material according to claim 1 wherein the glass frit contains a coloring pigment.

22. A process for the production of the material of claim 1 comprising mixing a noble metal powder with 1 to 70 volume % of a glass frit, pressing at room temperature with a pressure of 500 to 5000 bar then sintering at a temperature of 500° to 800° C. and then heat shaping at a temperature of 500° to 700° C. and a pressure of 100 to 200 bar.

23. A process according to claim 22 wherein the pressing is at 1000 to 3000 bar and the sintering is at 500° to 750° C.

24. A process according to claim 23 comprising applying a thermal post treatment at a temperature of approximately 400° C. above the transformation temperature of the glass frit to produce a glass coating on the surface of the material.

25. A material according to claim 1 consisting of the noble metal and the glass frit.

* * * * *